UNITED STATES PATENT OFFICE.

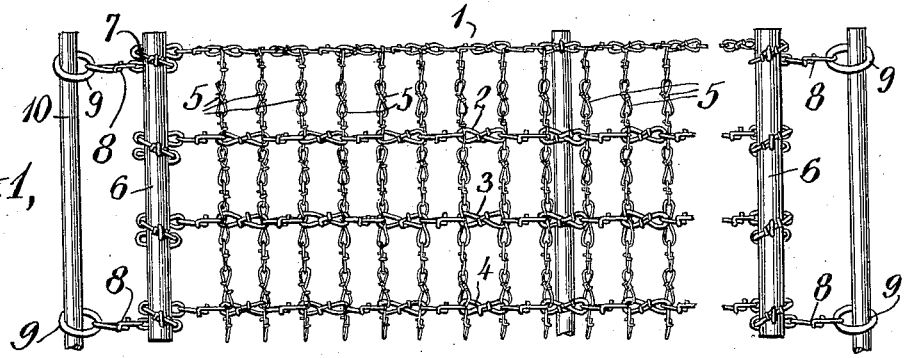
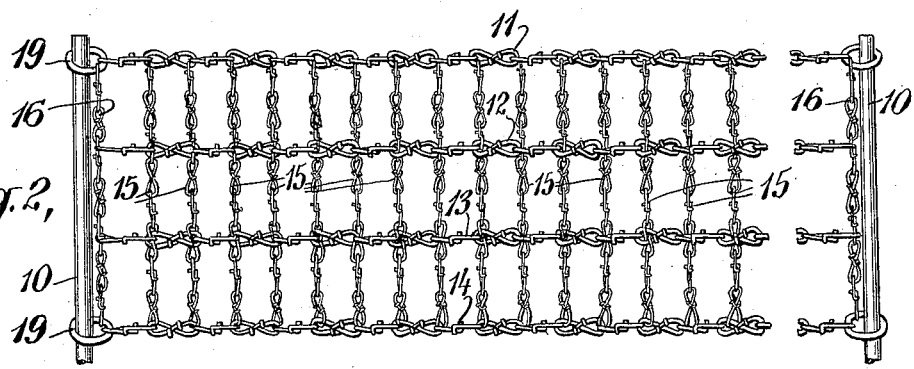
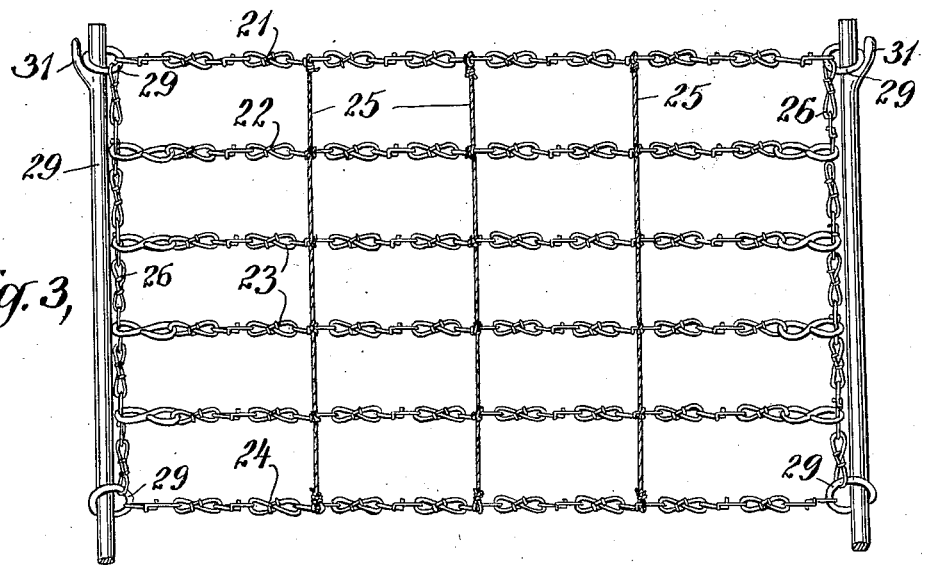

WILLIAM K. BLODGETT, OF POINT PLEASANT, NEW JERSEY, ASSIGNOR, BY MESNE ASSIGNMENTS, TO AMERICAN CHAIN COMPANY, INCORPORATED, OF BRIDGEPORT, CONNECTICUT, A CORPORATION OF NEW YORK.

FISH GUIDE OR LEADER.

1,095,698.  Specification of Letters Patent.  Patented May 5, 1914.

Application filed November 1, 1912. Serial No. 729,056.

*To all whom it may concern:*

Be it known that I, WILLIAM K. BLODGETT, a citizen of the United States, and resident of Point Pleasant, county of Ocean, State of New Jersey, have made a certain new and useful Invention Relating to Fish Guides or Leaders, of which the following is a specification, taken in connection with the accompanying drawing, which forms part of the same.

This invention relates to fish guides or leaders suitable for use in connection with fish pounds, the leader sections being preferably constructed of galvanized chain so as to have a relatively large cross-section as seen in the water and deter fish from attempting to pass through the same even when the mesh of the chain leader is ample to allow the fish to pass. In this way it is possible to use horizontal lines or chain members which are spaced a number of feet apart and connected with vertical stringer members of chain or other suitable material so as to form a structure of such open character as to be comparatively free from danger of breakage or becoming clogged with weeds or other material when in use.

In the accompanying drawing showing in a somewhat diagrammatic way several illustrative embodiments of this invention and in which the size of the chain links is considerably exaggerated, Figure 1 is a partial elevation of one form of chain leader. Fig. 2 shows another construction; and Fig. 3 shows still another form.

In the illustrative form of chain leader shown in Fig. 1 each leader section may comprise a top line or horizontal chain member 1 which may with advantage be made of relatively light galvanized chain, such as No. 4, which minimizes the breakage occurring when a boat runs through the chain and allows the broken ends of this top line to be fished up and connected so that the leader can be repaired with little trouble. The intermediate horizontal runs or members 2 and 3 are preferably formed of relatively heavier chain, such as No. 0, which gives sufficient strength and visibility for most purposes, these intermediate members being as numerous as necessary to give the desired width which of course corresponds to the depth of water in which the stationary fish guide is to be used. In many cases it is desirable to use a heavier chain for the bottom run or member 4, 5–0 chain or even heavier material being useful for this member in many cases. For most purposes where these chain leaders are used in the ordinary way for fish pounds or similar purposes these horizontal lines or members are preferably formed of relatively large link chain, the chain links having a width of about three-eighths to one inch or so and being of any suitable pattern and construction, ordinary twisted link machine made chain of the general character indicated being a cheap and available material which can be protected in any desired way against corrosion as by plating or galvanizing which also has the advantage of increasing its visibility and fish stopping or guiding action under service conditions. These horizontal or longitudinal members may be spaced apart a number of feet, five or six feet spacing giving good results for most purposes. These horizontal or longitudinal members may be connected by any suitable means as for instance by the substantially vertical or transverse members or stringers 5 which may be with advantage formed of relatively light chain such as No. 4, or thereabout, spaced about four to twelve inches or so apart and which can be secured to the horizontal runs or members in any desired way as by small S hooks or galvanized rings or "cold shuts" which are advantageous since in this way the entire leader may be formed of galvanized or protected chain material, the galvanizing being preferably made heavy so as to withstand the corroding action of sea water where the leader is intended for salt water fishing and the galvanizing is also advantageous in keeping the members relatively bright for a considerable period. The vertical members or stringers 5 may advantageously be extended below the bottom line 4 in some cases so that these depending portions may accommodate irregular bottom conditions, although this is not necessary in all cases. The leader sections may be made up in such lengths as are convenient for transportation and setting and where relatively short lengths, such as 100 or 200 feet are used it is advantageous for many purposes to have the ends of each leader section connected to suitable stretchers to not only maintain alinement of the horizontal lines or members, but to prevent undesirable sagging and for this purpose the stretchers or poles 6 three or four inches or so in diameter may be used and the horizontal lines or net members secured thereto in any desired way as by passing them around the stretchers and securing them thereto by staples 7. The projecting ends 8 of these horizontal lines or at least of the top and bottom lines may have suitable rings or fastenings 9 secured thereto to coöperate with the usual net poles 10 set in position at the proper intervals apart along the line of the stationary leader.

Fig. 2 shows a somewhat similar chain leader construction which may as indicated be formed entirely of chain preferably heavily galvanized or otherwise protected, the horizontal runs or lines 11, 12, 13 and 14 being indicated in this instance as of substantially uniform weight of chain, such for instance, as about No. 0 size, while the vertical members or stringers may be of chain if desired of about No. 4 size and spaced apart at the desired distances, say from 6 to 12 inches. The heavy side members 16 of each section may be connected to suitable rings or fastenings 19 to engage the poles 10 and be fastened thereto in any desired way when the net is set. It is of course understood that in making any form of these chain leaders it is unnecessary to use any particular style or construction of chain link provided the requisite strength is secured combined with the desired permanence and visibility under fishing conditions.

In the form of chain leader shown in Fig. 3 the horizontal lines or members 21, 22, 23 and 24 may be spaced several feet or so apart and connected to the heavy side members 26 and rings 29 which coöperate with the poles 30 preferably provided with suitable lugs or hooks 31 to support the rings 29. These horizontal lines or members may be held together in any desired way under fishing conditions as by connecting them by the transverse stringers or any suitable connectors which may be in the form of cords 25 which may be secured to these chain members so as to hold them apart at desired distances, substantially uniform spacing giving good results in most cases. Where the horizontal chain members are four to six feet apart these connectors or cords may with advantage be spaced a foot or so apart while with a closer spacing of the horizontal lines or chain members the connectors or cords may be considerably farther apart.

In the use of chain leaders of this description, the striking appearance of the large link chains or the bright appearance of the structure seems to keep the fish a number of feet away from it and when the fish, such as shad, weak fish, butter fish, or small blue fish, for instance, approach the net they are stopped or guided along the leader and thus led toward the pound or trap. The character or appearance of the structures seems to have stopping or guiding action on fish many times smaller than the actual size of the meshes, that is, the fish are guided along the leader instead of going through the meshes, although each mesh is actually large enough to allow many fish to pass simultaneously. The extremely open construction of these fish guides allows floating debris, such as seaweed or grass, to pass through them readily so that they do not become readily clogged with such material and offer relatively less resistance to water action, so that they are correspondingly freer from storm or other weather injury. These chain leaders are also relatively free from damage occasioned by chafing against poles or other parts and the weight of these chain leaders keeps them automatically in proper position in the water without the necessity of using special weighting devices. The strength and durability of such galvanized chain members and their freedom from chafing injury are advantageous in insuring their continued operation even under adverse conditions, the increased stopping power of this construction because of the character of the material used making it possible to use relatively larger meshes of much stronger material, both of which factors mean freedom from damage or interruption of their fishing action.

These inventions have been described in this case which comprises subject-matter taken from my application, No. 600,501, filed January 3, 1912, in connection with a number of illustrative embodiments, forms, sizes, proportions, materials and arrangements of parts, to the details of which disclosure the invention is not of course to be limited, but

What is claimed as new and what is desired to be secured by Letters Patent is set forth in the appended claims.

1. The fish guide having sections each comprising a top horizontal member composed of relatively light galvanized chain, one or more intermediate horizontal members of galvanized chain and a horizontal bottom member of relatively heavy galvanized chain, said horizontal members being formed of relatively large link chain and being substantially uniformly spaced at about four to six feet apart, vertical stringer members of relatively light galvanized chain connected to said horizontal members and spaced at about four to twelve inches apart and having portions depending below said bottom member to accommodate irregular bottom conditions, substantially rigid wooden stretchers to which said horizontal members are secured to prevent sagging or displacement of the members and means to connect the sections to supporting poles to form a structure of galvanized chain having such open mesh as to minimize debris collection, while acting as a guide to fish many times smaller than the actual size of the meshes.

2. The fish guide having sections each comprising a top horizontal member composed of relatively light galvanized chain, one or more intermediate horizontal members of galvanized chain and a horizontal bottom member of relatively heavy galvanized chain, said horizontal members formed of relatively large link chain and being substantially uniformly spaced at about four to six feet apart, vertical stringer members of relatively light galvanized chain connected to said horizontal members and spaced at about four to twelve inches apart, and means to connect the sections to supporting poles to form a structure of galvanized chain having such open mesh as to minimize debris collection while acting as a guide to fish many times smaller than the actual size of the meshes.

3. The fish guide, comprising a top horizontal member composed of relatively light galvanized chain, one or more intermediate horizontal members and a horizontal bottom member of relatively heavy chain, said horizontal members formed of relatively large link galvanized chain and being substantially uniformly spaced at about four to six feet apart, vertical stringer members connected to said horizontal members and spaced at about four to twelve inches apart, to form a structure having such open mesh as to minimize debris collection, while acting as a guide to fish many times smaller than the actual size of the meshes.

4. The fish guide comprising horizontal members formed of relatively large link galvanized chain and being substantially uniformly spaced at about four to six feet apart, vertical stringer members of relatively light galvanized chain connecting said horizontal members together and spaced at about four to twelve inches apart, to form a structure of galvanized chain having such open mesh as to minimize debris collection while acting as a guide to fish many times smaller than the actual size of the meshes.

5. The fish guide comprising horizontal members formed of large link protected and brightened chain and spaced at least several feet apart, vertical stringer members of relatively light chain connecting said horizontal members together and spaced at about four to twelve inches apart, to form a structure of chain having such open mesh as to minimize debris collection while having guiding action on fish many times smaller than the actual size of the meshes.

6. The fish guide comprising longitudinal members formed of chain and being spaced at least several feet apart, and transverse stringer members connecting said longitudinal members together to form a structure having such open mesh as to minimize debris collection and weather injury while having guiding action on fish many times smaller than the actual size of the meshes.

7. The fish guide comprising horizontal members formed of large link galvanized chain and being substantially uniformly spaced at about four to six feet apart, and vertical galvanized chain stringer members connecting said horizontal members together and spaced at about eight to twelve inches apart, to form a structure of chain having such open mesh as to minimize debris collection while having guiding action on fish many times smaller than the actual size of the meshes.

8. The stationary fish guide comprising longitudinal members of chain and spaced at least several feet apart, substantially transverse stringer members connecting a plurality of said longitudinal members together and coöperating supports for said members to form a structure having such open mesh as to minimize debris collection and capable of guiding fish many times smaller than the actual size of the meshes.

9. The stationary fish guide comprising longitudinal members of large link protected and brightened chain and substantially uniformly spaced at about four to six feet apart, substantially transverse stringer members of relatively light protected chain connecting said longitudinal members together and spaced at about four to twelve inches apart, and coöperating supports for said members to form a structure having such open mesh as to minimize debris collection and capable of guiding fish many times smaller than the actual size of the meshes.

10. The stationary fish guide comprising longitudinal members of large link protected and brightened chain and spaced at least several feet apart, substantially transverse stringer members of relatively light protected chain connecting said longitudinal members together and spaced at about four to twelve inches apart, and coöperating supports for said members to form a structure having such open mesh as to minimize debris collection and capable of guiding fish many times smaller than the actual size of the meshes.

11. The stationary fish guide comprising longitudinal members of chain and spaced at least several feet apart, substantially transverse stringer members connecting said longitudinal members together and spaced at about four to twelve inches apart, and coöperating supports for said members to form a structure having such open mesh as to minimize debris collection and capable of guiding fish many times smaller than the actual size of the meshes.

12. The stationary fish guide comprising longitudinal members of chain and spaced at least several feet apart, substantially transverse members connecting said longitudinal members together, and coöperating supports for said members to form a structure having such open mesh as to minimize debris collection and capable of guiding fish many times smaller than the actual size of the meshes.

13. The stationary fish guide comprising longitudinal members, substantially transverse stringer members of light protected and brightened chain connecting said longitudinal members together and spaced at about four to twelve inches apart, and coöperating supports for said members to form a structure having such open mesh as to minimize debris collection and capable of guiding fish many times smaller than the actual size of the meshes.

14. The stationary fish guide comprising longitudinal members, substantially transverse stringer members of chain connecting said longitudinal members together and spaced at about four to twelve inches apart, and coöperating supports for said members to form a structure having such open mesh as to minimize debris collection and weather injury and capable of guiding fish many times smaller than the actual size of the meshes.

15. The stationary fish guide comprising longitudinal members, substantially transverse stringer members connecting a plurality of said longitudinal members together, and coöperating supports for said members to form a structure comprising a substantial proportion of chain members and having such open mesh as to minimize debris collection and capable of guiding fish many times smaller than the actual size of the meshes.

16. The stationary fish guide comprising a series of primary members, a series of spaced secondary members arranged substantially transversely across and each connecting a plurality of primary members intersected thereby to form meshes, each having an area of at least several square feet, one of said series of members being formed of chain and coöperating supports for said members to form a structure having such open mesh as to minimize debris collection and capable of guiding fish many times smaller than the actual size of the meshes.

WM. K. BLODGETT.

Witnesses:
A. O. S. HAVENS,
V. W. LEE.

Copies of this patent may be obtained for five cents each, by addressing the "Commissioner of Patents, Washington, D. C."